March 21, 1967  ERWIN-WALTER SIBER ET AL  3,310,127
AUTOMATIC ENDLESS TRACK TENSION ADJUSTING MEANS
Filed March 17, 1965  4 Sheets-Sheet 1
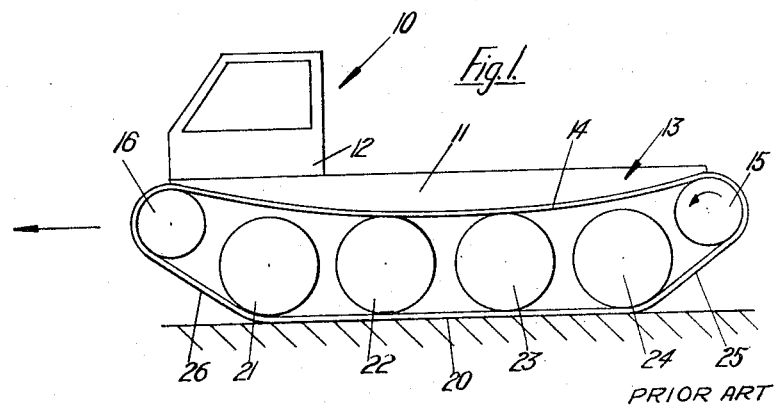
PRIOR ART
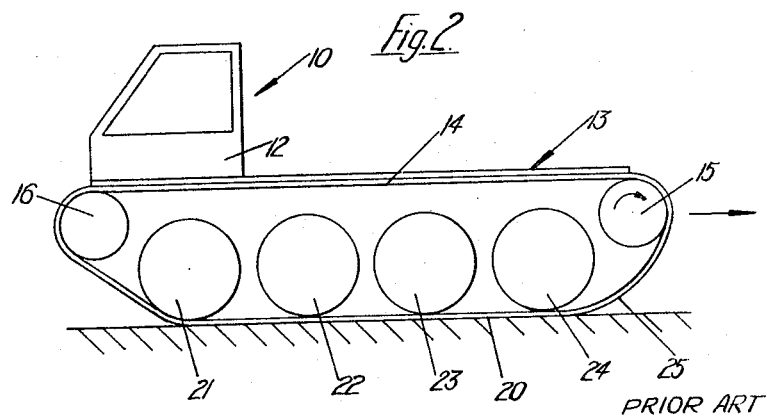
PRIOR ART
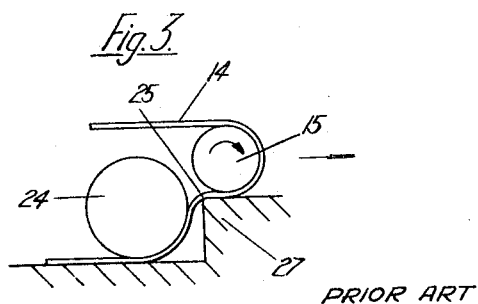
PRIOR ART

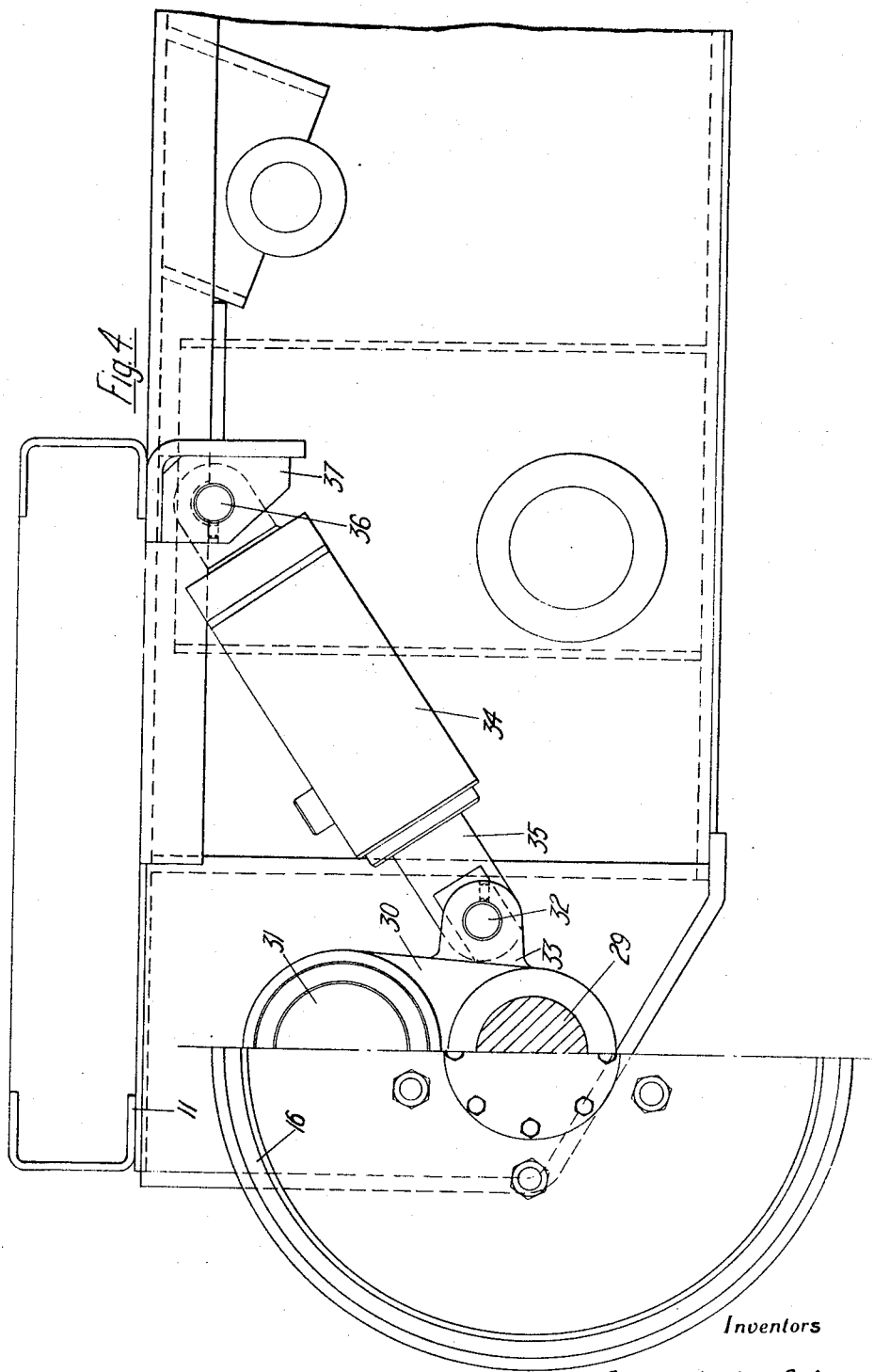

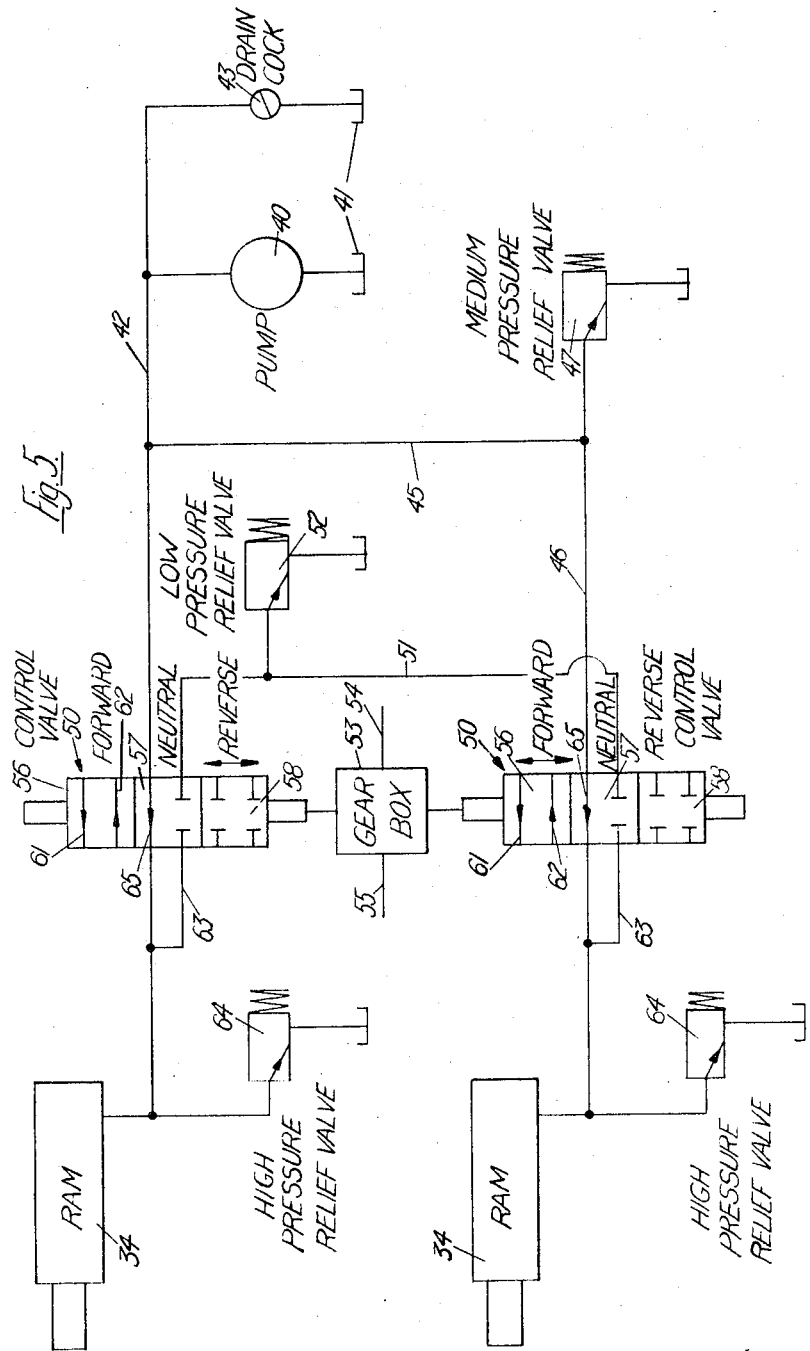

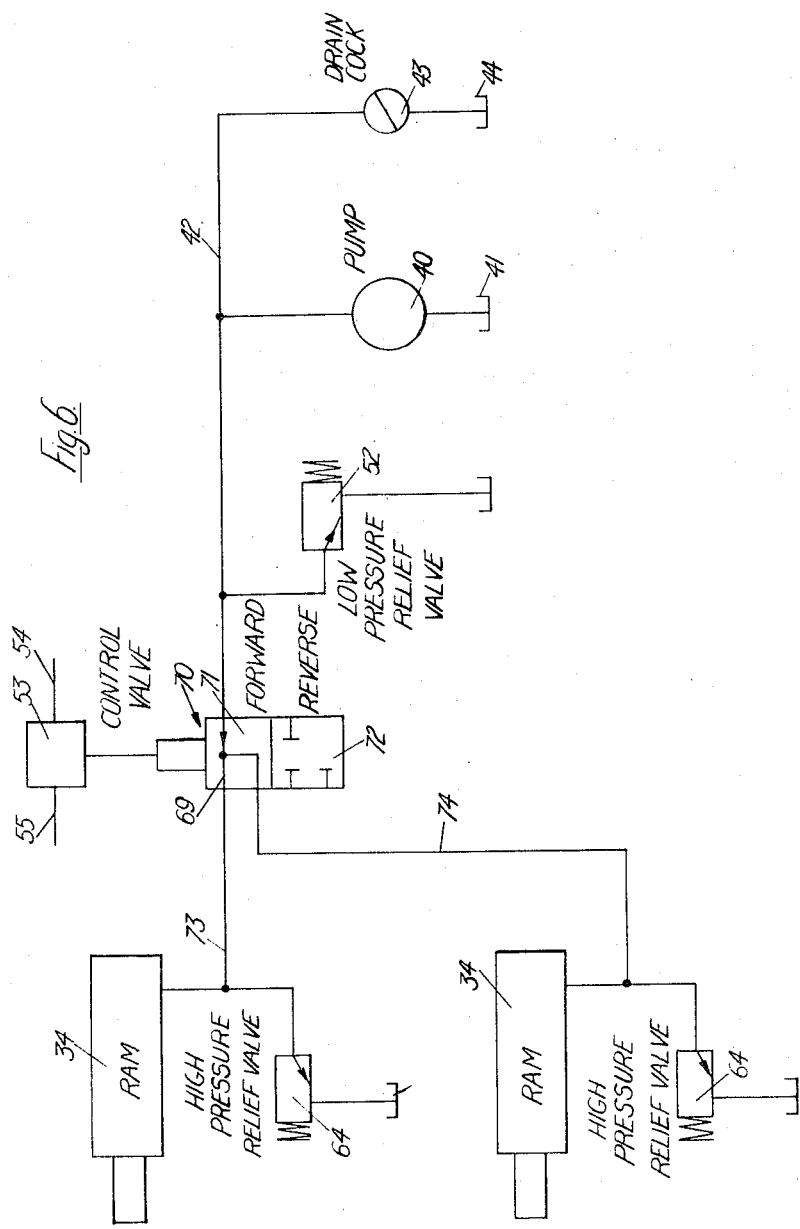

United States Patent Office

3,310,127
Patented Mar. 21, 1967

3,310,127
AUTOMATIC ENDLESS TRACK TENSION
ADJUSTING MEANS
Erwin-Walter Siber, Longueuil, Quebec, and Marvin William Keary, La Salle, Quebec, Canada, assignors to Go-Tract Limited, Longueuil, Quebec, Canada, a Canadian company
Filed Mar. 17, 1965, Ser. No. 440,529
Claims priority, application Great Britain, Feb. 17, 1965, 6,940/65
10 Claims. (Cl. 180—9.2)

This invention concerns a track assembly for a track-laying vehicle.

The tension in an endless track of a track-laying vehicle will vary in accordance with a number of factors. Thus it will vary in accordance with changes in the weight and position of the vehicle load. It will also vary both in accordance with the direction of travel of the vehicle and in accordance with the displacement of the road wheels of the vehicle relative to the vehicle body, such displacement occurring when the vehicle is travelling over rough ground, or is turning at high speed, or is climbing on or over obstacles.

The tension in the endless track will also vary in accordance with the amount of wear or stretch in the endless track, and in accordance with whether obstructions, such as tree branches or rocks, become trapped between the idler wheels or sprockets and the endless track.

If, however, the tension in the endless track should rise or fall excessively, the track will either become too taut or too slack. Excessive slackness will enable the track to become easily de-railed and/or to over-ride the teeth of the sprocket. On the other hand, unduly high tension in the track will cause overloading of the component parts of the track and this will cause these parts to wear and/or break more readily.

Moreover, as the track tension increases, so does the power required to drive the track. Thus if the tension in the track is too great, there is a larger power absorption by the track, with a corresponding loss of available propulsive power to move the vehicle over the ground.

According therefore to the present invention there is provided a track assembly for a track laying vehicle comprising an endless track having an upper run which is entrained over a sprocket and over an idler wheel which are respectively disposed at opposite ends of the upper run, the endless track having a lower run which is entrained over road wheels, track tensioning means, which are responsive to the tension in the said upper run, for automatically adjusting the spacing between the sprocket and the idler wheel so that the said tension is maintained substantially constant or within a predetermined range of values, and a tension adjustment device which may be set in at least two positions in each of which the said tension will have a different value or range of values.

The track assembly preferably comprises means for driving the sprocket forwardly and in reverse, and means for automatically placing the tension adjustment device in a selected one of said positions in accordance with whether the sprocket is being driven forwardly or in reverse, the said tension having a higher maximum value when the sprocket is being driven in reverse than when it is being driven forwardly.

The said means for driving the sprocket preferably includes a neutral position, the tension adjustment device being placed in a third position when neutral is selected.

The arrangement is preferably such that when neutral is selected, the said tension has a maximum value which is intermediate the respective maximum values which it has when the sprocket is being driven forwardly or in reverse.

The track tensioning means preferably adjusts the position of the idler wheel.

Thus, the track tensioning means may comprise a hydraulic circuit including a hydraulic ram for adjusting the position of the idler wheel, a pump for pressurizing hydraulic liquid in said circuit, and at least one pressure relief valve.

The tension adjustment device may comprise a control valve in said circuit, the control valve being disposed between the pump and the ram.

The control valve is preferably settable in an open and in a closed position. Moreover, the said circuit may include a low pressure relief valve which is disposed between the pump and the control valve, and a high pressure relief valve which is disposed between the control valve and the ram.

Alternatively, the control valve may control flow through two fluid conduits both of which communicate with the ram, one of said fluid conduits communicating with the pump and a medium pressure relief valve, and the other of said fluid conduits communicating with a low pressure relief valve, the ram communicating at all times with a high pressure relief valve.

Thus, the control valve may be settable in a first position in which both fluid conduits are open, a second position in which only the said one fluid conduit is open, and a third position in which both fluid conduits are closed.

The invention also comprises a track laying vehicle provided with at least one track assembly as set forth above.

The invention is illustrated, merely by way of example in the accompanying drawings, in which:

FIGURES 1 and 2 are diagrammatic side elevations of a track laying vehicle which is not provided with the track assembly of the present invention but which shows the positions of an endless track thereof when the vehicle is respectively travelling forwardly and rearwardly;

FIGURE 3 shows the position of a portion of an endless track of the vehicle of FIGURES 1 and 2 when the latter is being reversed over an obstacle;

FIGURE 4 is a broken-away elevation, partly in section, of a track assembly for a track laying vehicle according to the present invention, the said track assembly including an idler wheel which is movable by a hydraulic ram;

FIGURE 5 is a diagrammatic view of a hydraulic circuit for operating the hydraulic ram shown in FIGURE 4; and FIGURE 6 shows an alternative hydraulic circuit.

In FIGURE 1 there is shown a known track-laying vehicle 10 having a body 11 and a driver's cabin 12.

On each of the opposite longitudinal sides of the vehicle 10 there is provided an endless track 13. Each endless track 13 has an upper run 14 which is entrained over a sprocket 15 and over an idler wheel 16 which are respectively disposed at opposite ends of the upper run 14. Each of the endless tracks 13, moreover, has a lower run 20 which engages the ground and which is entrained over road wheels 21, 22, 23, 24 (and, if desired, over a number of other road wheels, not shown).

When the vehicle 10 is travelling forwardly, as shown in FIGURE 1, the portion 25 of each endless track between the rearmost road weel 24 and the sprocket 15 is subjected to the most tension. The upper run 14, and the portion 26 of each endless track between the road wheel 21 and the idler wheel 16, is tensioned only to the extent caused by the catenary shape which the upper run 14 adopts between the sprockets 15 and idler wheel 16.

If, therefore, in accordance with the present invention, each idler wheel 16 is moved towards and away from its sprocket 15, by the means described in detail below, it may be arranged that the catenary form, and hence the tension in, the upper run 14 of each endless track 13 may be maintained substantially constant.

In FIGURE 2, the vehicle 10 is shown as travelling rearwardly, i.e. reversing, and it will be noted that the maximum tension in each endless track 13 occurs in its upper run 14 and in the portion 26 of the track.

When travelling rearwardly, the extra length of each endless track 13 that forms the catenary of the upper run 14 when the vehicle was running forwardly, now bulges out at the portion 25. As a result, when the vehicle 10 meets an obstacle 27 as shown in FIGURE 3, the portion 25 of each endless track is forced into a reverse bend, and is therefore excessively loaded, whereby the track may be damaged or its life may be decreased. Such a reverse bend may also cause the track to be derailed or misguided. Moreover, more power is required to lift the vehicle onto and over the obstacle 27 than would otherwise be the case, and in some instances, the vehicle 10 will be unable to surmount the obstacle 27.

This condition may, however, be corrected by moving the idler wheels 16 away from the road wheels 21 a sufficient distance to take up the slack in each endless track, and holding the idler wheels 16 in position against the higher track tension which is due to the power being transmitted by the sprockets 15.

In FIGURE 4 there is shown part of a track assembly, in accordance with the present invention, for the vehicle 10, the idler wheels 16 being movable towards and away from the sprockets 15.

Each idler wheel 16 is mounted on a spindle 29 which is carried at one end of a pivot arm 30 whose other end is rotatably mounted on a shaft 31 which is fixed (by means not shown) to the vehicle body 11.

A pivot pin 32 extends between a pair of lugs 33 (only one shown) which form part of each pivot arm 30. A hydraulic ram 34 has a piston rod 35 whose outer end is rotatable about the respective pivot pin 32. Each ram 34, at its end remote from its piston rod 35, is mounted on a pivot pin 36 which is carried by a bracket 37 fixed to the vehicle body 11. Thus, if the pressure of hydraulic fluid supplied to the rams 34 is respectively increased and decreased, the idler wheels 16 will be respectively moved further away from and towards their sprockets 15.

In FIGURE 5 there is shown diagrammatically a hydraulic circuit for supplying the rams 34 with hydraulic liquid.

Referring to FIGURE 5, a fixed displacement, engine-driven pump 40 is arranged to pump hydraulic liquid from a tank 41 to a fluid conduit 42. The fluid conduit 42 communicates via a drain cock 43 with the tank 41. The fluid conduit 42 also communicates via a pipe 45 with a fluid conduit 46 which itself communicates with a medium pressure relief valve 47.

Connected in each of the fluid conduits 42, 46 is a three position control valve 50 each of which is disposed between the pump 40 and the respective ram 34. A fluid conduit 51, which communicates with a low pressure relief valve 52, extends between the two control valves 50.

Each of the control valves 50 is connected to a gear box 53 forming part of a drive transmission including a drive shaft 54, which is driven by the vehicle engine (not shown), and a shaft 55 which transmits the drive to the sprockets 15. The gear box 53 has a reverse gear (not shown) and at least one forward gear (not shown), it also being possible to select a neutral position. The required gear may be selected either manually or automatically (by means of a gear shift or selector lever, not shown). The gear box 53 is connected to the control valves 50, so that the position of these control valves depends upon whether reverse gear, a forward gear, or neutral has been selected. Systems for actuating a device in accordance with gear positions within a gear box are well known in the art as exemplified by the Henschkel Patent 2,264,441.

Alternatively, the control valves 50, instead of being connected to the gear box 53 itself, may be connected to a mechanical, hydraulic, or electric actuator (not shown) which is connected to the said gear shift or selector lever, or may be connected in any other suitable place in the selector/shift mechanism.

Each of the control valves 50 has three portions 56, 57, 58 each of the portions 56 having two passages 61, 62 therethrough. When a forward gear is selected, the passages 61 are respectively aligned with the fluid conduits 42, 46, while the passages 62 are respectively aligned with opposite ends of the fluid conduit 51. The passages 62 are also aligned at this time with passages 63 which extend to the portions of the conduits 42, 46 on the side adjacent the rams 34.

Each of the rams 34 communicate at all times with a high pressure relief valve 64. Both the fluid conduits 42, 51 communicate with the rams 34. Thus when forward gear is selected, both the fluid conduits 42, 46 and the fluid conduit 51 are open.

It will be appreciated that when a forward gear is selected, each ram 34 will be supplied with hydraulic liquid at a pressure determined by the low pressure relief valve 52. This allows the rams 34 to contract (if necessary) until the track tension is just sufficient to maintain a catenary in the upper run 14 similar to that shown in FIGURE 1.

If the pressure in the rams 34 should fall, the flow pressure relief valve 52 will close until the pump 40 has re-established the pressure. When this takes place, the low pressure relief valve 52 will open and will maintain the hydraulic circuit at a substantially constant pressure. Any increase in the tension in the endless tracks 13 will be transmitted via the idler wheels 16 to the rams 34 and this will result in a rise in the pressure in the hydraulic circuit. This will cause the low pressure relief valve 52 to open still further allowing the rams 34 to contract and so reduce the tension in the upper runs of the endless tracks to the predetermined level.

Thus, while the vehicle 10 is travelling forwardly, the spacing between each sprocket 15 and its idler wheel 16 will be automatically adjusted so that the tension in the upper run 14 is maintained substantially constant or within a predetermined range of values.

When neutral is selected, the portion 57 of each of the control valve 50 is in the position shown. In this position, a passage 65 in each portion 57 is aligned with the fluid conduits 42, 46 so that these conduits are open. In this position, however, the fluid conduit 51 will be closed since it will not communicate with the passages 63.

In the neutral position, therefore, the low pressure relief valve 52 will no longer control the pressure in the rams 34 and this pressure will instead be controlled by the medium pressure relief valve 47. The pressure in the hydraulic circuit will thus rise until it causes the medium pressure relief valve 47 to open, whereby a pressure balance is achieved between the pressure in the hydraulic circuit and the track tension.

When reverse gear is selected, the gear box 53 causes the portion 58 of each control valve 50 to move into the position in which the fluid conduits 42, 46 and the fluid conduit 51 are closed. In order to achieve the reverse position, however, the gear shift or selector lever must either start from or must pass through the neutral position. As a result, the rams 34 will be pressurized at the pressures determined by the medium pressure relief valve 47. The track tension is in consequence sufficient to reduce the catenary of each upper run 14 and this reduction in the track catenary is sufficient to reduce bulges at the portions 25 to an acceptable level when the vehicle 10 is travelling in reverse.

When reverse gear is selected, pressure fluid, at the said medium pressure will thus be trapped in the portions of the fluid conduits 42, 46 between the control valves 50 and the rams 34. Since the rams 34 no longer communicate with the low pressure relief valve 52 or with the medium pressure relief valve 47, the pressure in these portions will be controlled by the high pressure relief valves 64. These valves 64 will not open by reason merely of the load on the idler wheels causer by the maximum power available from the sprockets 15. However, if the tension of the endless tracks should increase to a level above the maximum normal track tension, then the high pressure relief valves 64 will open and will allow the rams 34 to contract so as to relieve the tension in the endless tracks. For example, this would occur if a tree branch or log became trapped between the idlers 16, or sprockets 15, and the tracks 13.

If, as a result of the opening of each high pressure relief valve 64 each track 13 becomes too slack, the driver of the vehicle will have to move the gear selector or gear shift lever into its neutral position in order to retension the endless tracks. However, as this will be a rare occurrence, this should not be a serious disadvantage.

As will be appreciated, the tension in each endless track has a higher maximum value when reverse gear is selected than when a forward gear is selected. It will also be appreciated that when neutral is selected, the tension in the track has a maximum value which is intermediate the respective maximum values which it has when reverse gear or a forward gear is selected.

The control valves 50 may be either of the slide type or the rotary type. If desired, the control valves 50, in addition to being positioned by the gear box 53, may be independently positionable by a separate control (not shown).

Although oil filters have not been shown in the hydraulic circuit shown in FIGURE 5, these would, in practice, be used in suitable locations. As will be seen the hydraulic circuit provides independent automatic track adjustment for each track of a vehicle.

If an endless track 13 should break, the respective idler wheel 16 will move forward until its ram 34 is fully extended. In order to fit either the repaired track or a new track, the control valves 50 should be placed in their neutral or forward positions, with the pump 40 not operating, and the drain cock 43 should be opened. This permits the idlers 16 to move rearwardly. A similar procedure should be adopted if a ram 34 has to be removed for servicing or replacement.

The hydraulic circuit of FIGURE 5 could be applied to a vehicle 10 fitted with a front sprocket and a rear idler, except that in this case the positions of the portions 56, 58 of the control valves 50 would have to be interchanged.

The hydraulic circuit of FIGURE 5 could also be applied to a vehicle 10 which is fitted with top rollers over which the upper runs 14 pass, although the change in the required track length from forward to reverse running would, in this case, be reduced.

In the FIGURE 6 construction, there is shown a hydraulic circuit which is in several respects similar to that of FIGURE 5, and which for that reason will not be described in detail. In the FIGURE 6 construction, however, a single control valve 70 is employed which is a two-position valve having portions 71, 72. When forward gear is selected, the portion 71, which has a passage 69 therethrough, is in the position shown in which it communicates with the fluid conduit 42. In this position, moreover, the fluid conduit 42 communicates with passages 73, 74 which lead to the rams 34. The low pressure relief valve 52 communicates at all times with the fluid conduit 42 and is disposed between the pump 40 and the control valve 70.

It will thus be appreciated that when forward gear is selected, the control valve 70 is set in an open position in which hydraulic liquid at the pressure of the low pressure relief valve 52 is supplied to the rams 34.

When, however, reverse gear is selected, the control valve 70 is placed in a closed position in which the passages 73, 74 no longer communicate with the fluid conduit 42. In this position, the high pressure relief valves 64, which are disposed between the control valve 70 and the rams 34, control the maximum pressure in the rams 34. That is to say, pressure liquid at the pressure of the low pressure relief valve 52 is trapped between the rams 34 and the control valve 70 and this pressure will, to some extent, reduce the bulges at the portions 25. If the portions 25 should become reversely bent, and the pressure in the rams 34 should rise excessively in consequence, pressure relief will be afforded by the high pressure relief valves 64.

The hydraulic circuit shown in FIGURE 6 will not, of course, be as effective in appropriately tensioning the endless tracks as will that of FIGURE 5, but it will be suitable for application to a vehicle where reverse motion is fairly rarely used, since it employs fewer parts and is therefore less expensive.

We claim:

1. A track laying vehicle comprising at least one endless track, a movable member over which the track is entrained, a hydraulic circuit which comprises a hydraulic ram for adjusting the position of the movable member to adjust the tension in the endless track, means for supplying said circuit with hydraulic liquid under pressure, at least one pressure relief valve in said circuit to prevent the pressure applied to the ram from exceeding a respective predetermined value, at least one control valve in said circuit which is settable to alter the pressure applied to the ram, and a forward and reverse directional control means which both controls the direction in which the vehicle is driven and concurrently adjusts the control valve, to alter the pressure applied to the ram, whenever a predetermined change occurs in the said direction.

2. A vehicle as claimed in claim 1 in which the directional control means comprises a gear mechanism for driving the vehicle forwardly and in reverse, the pressure applied to the ram having a higher maximumm value when the vehicle is being driven in reverse than when it is being driven forwardly.

3. A vehicle as claimed in claim 2 in which the means for driving the vehicle has a neutral position, the said pressure, when neutral is selected, having a maximum value which is intermediate the respective maximum values which it has when the vehicle is being driven forwardly or in reverse.

4. A vehicle as claimed in claim 1 in which the endless track is entrained over a sprocket and an idler wheel which are respectively disposed at opposite ends of the endless track, the said idler wheel constituting the said movable member.

5. A vehicle as claimed in claim 1 in which the means for supplying the circuit with hydraulic liquid comprises a pump.

6. A vehicle as claimed in claim 5 in which the control valve may be set in an open and in a closed position.

7. A vehicle as claimed in claim 6 in which a low pressure relief valve is disposed between the pump and the control valve, and a high pressure relief valve is disposed between the control valve and the ram.

8. A vehicle as claimed in claim 5 in which the hydraulic circuit comprises two fluid conduits both of which communicate with the ram, and flow through both of which is controlled by the control valve, one of said fluid conduits communicating with the pump and with a medium pressure relief valve, and the other of said fluid conduits communicating with a low pressure relief valve, the ram communicating at all times with a high pressure relief valve.

9. A vehicle as claimed in claim 8 in which the control valve may be set in a first position in which both fluid conduits are open, a second position in which only the said one fluid conduit is open, and a third position in which both fluid conduits are closed.

10. A vehicle as claimed in claim 1 in which the track is formed to permit reverse bending thereof.

References Cited by the Examiner
UNITED STATES PATENTS

| | | | |
|---|---|---|---|
| 2,818,311 | 12/1957 | Ashley | 305—10 |
| 3,082,043 | 3/1963 | Orton | 180—9.2 X |
| 3,101,977 | 8/1963 | Hyler | 305—10 |
| 3,116,956 | 1/1964 | Maradyn | 305—10 X |

BENJAMIN HERSH, *Primary Examiner.*

RICHARD J. JOHNSON, *Examiner.*